United States Patent

[11] 3,631,920

[72] Inventors: Hideo Nishikawa; Akihiro Kawaguchi, both of Akashi; Koichi Washimi; Masaaki Kanbayashi, both of Iwaki, all of Japan
[21] Appl. No.: 14,088
[22] Filed: Feb. 25, 1970
[45] Patented: Jan. 4, 1972
[73] Assignees: Kureha Kagaku Kogyo Kabushiki Kaisha; Mitsubishi Jyukogyo Kabushiki Kaisha Tokyo-to, Japan

[54] CHANGEOVER-TYPE REGENERATIVE HEAT-EXCHANGE APPARATUS
1 Claim, 1 Drawing Fig.

[52] U.S. Cl. .................................................. 165/4, 122/28, 122/459, 263/19 R, 236/15 C
[51] Int. Cl. .................................................. F28d 17/00
[50] Field of Search .................................................. 165/4, 7; 263/19 R; 236/15 C; 122/28, 459

[56] References Cited
UNITED STATES PATENTS

| | | | |
|---|---|---|---|
| 3,180,629 | 4/1965 | Goeke et al. | 263/19 |
| 2,776,872 | 1/1967 | Norton, Jr. | 263/19 X |
| 2,944,806 | 7/1960 | Carter | 263/19 X |
| 3,348,832 | 10/1967 | Kinney et al. | 263/19 X |

FOREIGN PATENTS

| | | | |
|---|---|---|---|
| 156,022 | 4/1954 | Australia | 165/4 |

Primary Examiner—Albert W. Davis, Jr.
Attorneys—Robert E. Burns and Emmanuel J. Lobato ABSTRACT: A regenerative heat-exchange apparatus of changeover-type comprising two or more regenerative heat-exchanger units and operated to cause a process fluid to undergo heat exchange continuously through changeover operation and to deliver the fluid in a desired state is provided with a first fluid supply system for supplying the process fluid at a constant flowrate to each of the heat-exchanger units, a supply device for charging the fluid into each unit separately from the first fluid supply system, and a detecting device for detecting the pressures within each of the units.

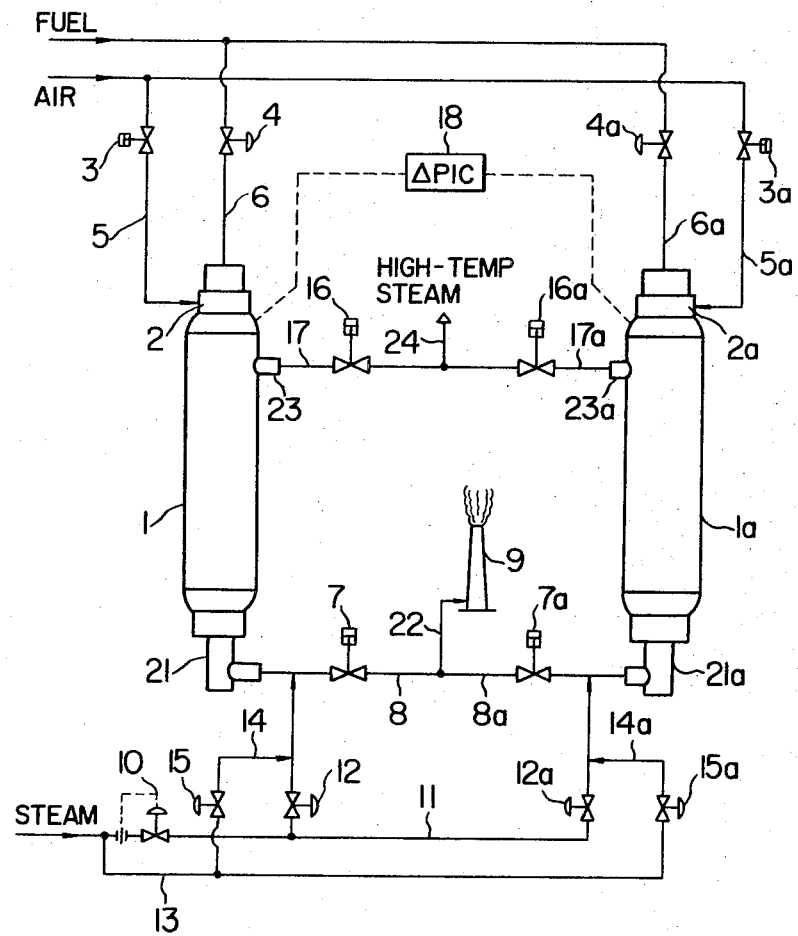

CHANGEOVER-TYPE REGENERATIVE HEAT-EXCHANGE APPARATUS

BACKGROUND OF THE INVENTION

This invention relates generally to thermodynamic plant equipment and more particularly to a new and improved regenerative heat-exchange apparatus of changeover type for delivering at a constant flowrate a fluid (herein referred to as a "process fluid") in a constant desired state.

Among regenerative heat-exchange apparatuses there are those of the changeover type wherein a plurality of regenerative heat-exchanger elements or units are provided, and, by passing a heating or cooling medium through certain first heat-exchanger units from among these units to store heat therewithin or extract heat therefrom, heating or cooling a fluid to be heated or cooled (constituting the above-mentioned process fluid) in the remaining heat-exchanger units which previously have been thus charged with heat or cooled, and causing mutual changeover of the heat charging or extraction state, and the heat-discharging or heat absorption state when the first heat-exchanger units have been heated or cooled to a predetermined temperature, the process fluid is continuously heated or cooled.

In a heat-exchange apparatus of this character for heating the process fluid, the pressure of the process fluid is generally higher than the pressure of the heating medium. Furthermore, in order to minimize as much as possible mixing of the heating medium and the process fluid at the time of changeover, the process fluid at high pressure is supplied after the heating medium in each heat-exchanger unit in which heat accumulation has been completed has been discharged, and the pressure thereof has thereby been reduced.

Accordingly, when the valve on the discharge side of the process fluid circuit in a heat-exchanger unit which has completed heat accumulation is progressively opened as the valve on the discharge side of the process fluid circuit in a heat-exchanger unit which is discharging heat is progressively closed, with the aim of continuously delivering the process fluid, the pressure of the process fluid in the unit undergoing heat discharge is higher than that of the fluid in the unit which has completed heat accumulation and is about to start heat discharging. For this reason, a portion of the fluid in the unit undergoing heat discharging flows into the latter unit, whereby delivery of the process fluid at an intended constant flowrate to an apparatus or device requiring the fluid cannot be accomplished.

SUMMARY OF THE INVENTION

It is an object of the present invention to provide an improved regenerative heat-exchange apparatus of the changeover type in which the above-described difficulty is overcome. More specifically, an object of the invention is to provide an apparatus of the above stated class capable of causing a process fluid at a constant pressure to undergo heat exchange and delivering this fluid continuously at a constant flowrate and in a constant desired state.

According to the present invention, briefly summarized, there is provided a regenerative heat-exchange apparatus of the changeover type comprising a plurality of regenerative heat-exchanger units in which a process fluid is caused to undergo heat exchange and be supplied in a continuous manner at a constant flowrate by changeover operation, wherein a fluid applying device for charging the process fluid into each heat-exchanger unit is provided separately from a system for supplying the process fluid at a constant flowrate to each unit, and, moreover, there is provided a detecting device for detecting the pressures in all of the units.

The nature, principle, details, and utility of the invention will be more clearly apparent from the following detailed description beginning with general considerations and concluding with an example of a preferred embodiment of the invention as illustrated in the accompanying drawing.

BRIEF DESCRIPTION OF THE DRAWING

In the drawing, the single figure is a schematic piping diagram in the form of a flow chart indicating the essential organization and operation of an example of a changeover type, regenerative heat-exchange apparatus according to the invention.

DETAILED DESCRIPTION

By operating in the following manner the regenerative heat-exchange apparatus according to the invention as briefly summarized hereinabove, a process fluid at a predetermined pressure can be caused to undergo heat exchange at a constant flowrate and thereafter delivered in a constant desired state.

An operational medium with which the process fluid is to undergo heat exchange is supplied into one or more units of the aforementioned plurality of regenerative heat exchanger units to accumulate or store heat therewithin, and the process fluid is supplied into the remaining units in which heat has been previously accumulated thereby to cause this fluid to undergo heat exchange. Then, with the apparatus in this operational state, the supply of the operational medium to the units is stopped upon completion of their heat accumulation, and the operational medium within the units is discharged. Thereafter, as the pressure within these units is detected by the aforementioned detector, the process fluid is charged thereinto by means of the aforementioned fluid-supplying device.

Then, then the pressure within these units become equal to the pressure within the units in which heat fluid is already undergoing heat exchange, the operation of the fluid-supplying device is stopped, and the system for supplying the process fluid at a constant flowrate is opened for operation. At the same time, the system supplying the process fluid at a constant flowrate into the units already causing the fluid to undergo heat exchange is shut off. This changeover operation is cyclically repeated to cause the process fluid at a predetermined pressure to undergo heat exchange at a constant flowrate.

Thus, by the practice of the invention, it is possible to cause the process fluid to undergo heat exchange continuously while its pressure and flowrate are maintained constant, even during the process step of switching or changing over the plurality of heat-exchanger units, and to supply the fluid thus processed to an apparatus or device requiring this fluid.

Referring now to the drawing, a regenerative heat-exchange apparatus of changeover type illustrating a preferred embodiment of the invention, is provided with two steam heaters 1 and 1a each constituting a regenerative heat-exchanger element or unit and having a heat-accumulating device (not shown) installed therein and a combustion device 2 (or 2a). These two steam heaters 1 and 1a are connected in parallel arrangement in the following manner.

Each steam heater 1 (or 1a) is provided on its heat source side with an air-supply pipe line 5 (or 5a) having a valve 3 (or 3a) and a fuel-supply pipe line 6 (or 6a) having a valve 4 (or 4a), both lines being connected to the above-mentioned combustion device 2 (or 2a). When air and fuel are supplied through lines 5 (5a) and 6 (6a) into the combustion device 2 (2a), the fuel is burned therewithin, and the resulting combustion gas flows through the steam heater 1 (1a) thereby to heat the heat-accumulating device (not shown) installed within the heater is discharged from the heater through a gas outlet 21 (21a).

This gas outlet 21 (21a) is connected to one end of an exhaust pipe line 8 (8a) having a valve 7 (7a), and the other ends (i.e., downstream ends) of these lines 8 and 8a are mutually jointed and connected to a pipeline 22 to chimney or stack 9. Accordingly, when fuel is burned in the combustion device 2 (2a) the valve 7 (7a) is open, and the combustion gas is exhausted from the gas outlet 21 (21a), through the exhaust line 8 (8a), line 22, and stack 9, and into the atmosphere.

For supplying to the steam heater 1 (1a) steam constituting a desired fluid, a steam supply pipeline 11 is branched and connected by way of valves 12 and 12a to the above mentioned exhaust lines 8 and 8a at points thereof upstream (with respect to the combustion gas flow) from the valves 7 and 7a. This stream supply line 11 is provided at a part thereof upstream from the valves 12 and 12a with an automatic flowrate controlling valve 10 for causing steam to be supplied at a constant flowrate.

Furthermore, the upstream end of a charging pipeline 13 is connected to the stream supply line 11 at a point thereof upstream from the flowrate controlling valve 10. This charging line 13 is divided in its downstream direction into two branch lines 14 and 14a, which are respectively connected by way of valves 15 and 15a of small capacity of the branches of the stream supply line 11 at points thereof downstream from the valves 12 and 12a.

The stream heaters 1 and 1a have steam outlets 23 and 23a respectively connected through high-temperature steam lines 17 and 17a having valves 16 and 16a to a common delivery line 24, through which the resulting high-temperature steam is supplied to an apparatus or device (not shown) requiring this steam.

In addition, a differential pressure detector 18 is provided to measure the pressures in the interiors of the heat parts (parts near the steam outlets 23 and 23a) of the steam heaters 1 and 1a and to detect the difference therebetween.

The regenerative heat exchanging apparatus of the above described organization according to the invention is operated in the following manner.

First, one steam heater, for example, steam heater 1, is operated by opening valves 3, 4, and 7, closing valves 12, 15, and 16, burning fuel in combustion device 2, and exhausting the resulting combustion gas from steam heater 1, through line 8 and stack 9, into the atmosphere. At the same time, the other steam heater is operated by opening valves 12a and 16a, closing valves 3a, 4a, 7a, and 15a, and supplying steam controlled by automatic flowrate controlling valve 10 to flow at a constant flowrate into steam heater 1a.

Under the above described operational conditions of the apparatus, the heat-accumulating device (not shown) in one steam heater 1 is heated by the combustion gas and thereby stores heat energy, while the steam flowing through the interior of the other steam heater 1a undergoes heat exchange with the heat-accumulating device (not shown) provided in this steam heater and heated previously (it being assumed that the operation has been continuing) and is heated to a high temperature to be supplied through lines 17a and 24 to the apparatus requiring the high-temperature steam.

When, under these operational conditions, the heat-accumulating device within steam heater 1 has accumulated sufficient heat and is at a specified temperature, and, moreover, the heat-accumulating device within the other steam heater 1a has been cooled by the supplied steam, the quantity of residual combustion gas within steam heater 1 is reduced as much as possible by first closing valves 3 and 4 to stop the combustion within combustion device 2 and exhausting the combustion gas within steam heater 1 to the atmosphere thereby to lower the pressure therein to atmospheric pressure. Valve 7 is then closed, and valve 15 is opened to supply steam gradually into steam heater, whereupon the pressure within this steam heater rises.

Then, when differential pressure detector 18 detects the state wherein the pressures within steam heaters 1 and 1a have reached equilibrium, valve 15 is closed, valves 12 and 16 are opened, and valves 12a and 16a are closed. The steam which has been flowing through steam heater 1a up to this time is thereupon supplied to steam heater 1, in which heat has been accumulated, and, after being heated therein, is discharged through steam outlet line 17 and high-temperature steam line 24.

The steam which flows through steam line 11 in this case is maintained at a constant flowrate by automatic flowrate control valve 10. Furthermore, since the steam pressure within steam heaters 1 and 1a are in equilibrium, high-temperature steam maintained at a constant pressure is continuously supplied at a constant flowrate to the apparatus or device requiring this steam.

Another feature of this apparatus is that, during the charging of steam into steam heater 1 from which combustion gas has been exhausted, steam is charged thereinto through branch line 14 branching from charging line 13 which is connected at its upstream end to the steam supply line upstream from automatic flowrate control valve 10. For this reason, the flowrate of the steam supplied to steam heater 1a, which is undergoing heat exchange, is maintained constant. Furthermore, since the capacity of valve 15 installed in branch line 14 is small, steam is charged gradually into steam heater 1, in which the pressure is thereby uniformly distributed, whereby there is no possibility of shifting or deformation of the heat-accumulating device therewithin due to fluid forces caused by a pressure difference.

A further feature of this apparatus according to the invention is that, since the automatic flowrate control valve 10 and the valves 12 and 12a downstream therefrom are in respectively divided arrangement in the steam line 11, it is possible to supply steam at constant flowrate readily and reliably even during the changing over of these valves 12 and 12a. Moreover, the construction of these valves can be simplified.

It should be understood of course, that the foregoing disclosure relates to only a preferred embodiment of the invention and that it is intended to cover all changes and modifications of the example herein chosen for the purposes of the disclosure, which do not constitute departures from the spirit and scope of the invention. For example, while the invention has been described above with respect to an example in which the process fluid is a fluid to be heated, it will be apparent from the principles of thermodynamics that an apparatus according to the invention can be adapted to process a process fluid which is a fluid to be cooled.

Furthermore, while no specific mention of automatic control or of automatically controlled components was made in the foregoing description, it will be apparent that an automatic control system of any of the known types can be installed in the apparatus of the invention to operate cooperatively with the detecting device 18 and other detectors, such as a temperature gauge (not shown) in the delivery line 24, to controllably operate all valves and other controls such as ignition means (not shown) for igniting fuel in the combustion devices 2 and 2a.

We claim:

1. A changeover-type regenerative heat-exchanging system comprising in combination: a plurality of regenerative heat exchangers, each containing therein heat-accumulating medium to store heat, a combustion device to heat said said heat-accumulating medium to a required temperature to enable the same to undergo heat-exchanging operation with a process fluid to be heated, a first outlet for exhaust gas generated by said combustion device, and a second outlet for said process fluid; a process fluid delivery line connected to each said second outlet supply lines for fuel and air connected to said combustion device for each regenerative heat-exchanger; an exhaust gas line connected to said first outlet of each said heat-exchanger; a supply line for supplying said process fluid to each said heat-exchanger branched and connected to said exhaust gas lines; an automatic flow control valve in said process fluid supply line to secure constant flowrate of the process fluid supplied; an auxiliary process fluid changing line branched from said process fluid supply line upstream of said flow control valve and leading to each said heat exchanger; a differential pressure detector to measure the pressure in the interior of the heat-exchangers adjacent said second outlet and to detect pressure difference existing in said heat exchangers and each of said fuel supply lines, air supply lines, exhaust gas lines process fluid supply lines, process fluid delivery lines, and auxiliary process fluid charging lines being provided with valve means, whereby the changing over of the heat-exchanging operation from one heat-exchanger to the other is carried out by opening and closing operations of said supply, exhaust, and charging valves while maintaining a constant flowrate and pressure of the process fluid.

* * * * *